United States Patent
Johnson

[15] 3,654,892
[45] Apr. 11, 1972

[54] ZONAL DEVICE AND COMBINATION THEREOF WITH A DIMENSIONAL DIAL INDICATOR

[72] Inventor: Stanley G. Johnson, W. Hartford, Conn.
[73] Assignee: The Johnson Gage Company, Bloomfield, Conn.
[22] Filed: July 17, 1970
[21] Appl. No.: 55,896

[52] U.S. Cl. .......................... 116/129, 33/172 R, 58/126, 73/431, 116/115
[51] Int. Cl. ................................................. G09f 9/00
[58] Field of Search ........... 33/147, 148, 166, 172, 199, 33/224; 73/431; 116/129, 129 A, 129 B, 129 T, 115.5, 115, 133, 124; 58/126, 126 B, 152

[56] References Cited

UNITED STATES PATENTS

| | | | |
|---|---|---|---|
| 1,027,549 | 5/1912 | Kronert | 116/133 UX |
| 2,961,771 | 11/1960 | Fronek | 116/115 X |
| 3,353,277 | 11/1967 | Johnson | 33/199 A |
| 3,475,902 | 11/1969 | Wessel | 58/126 |

*Primary Examiner*—Louis J. Capozi
*Attorney*—John M. Montstream

[57] ABSTRACT

A zonal device and a combination of a dial indicator and the zonal device is disclosed for cooperative use on a gage or gages in differentially gaging a screw thread. The indicator has a casing with an outer cylindrical surface, a dial having dimensional graduations in thousandths or preferably in ten-thousandths of an inch, and a pointer movable over the dial in response to a contactor. The zonal device is a ring means mounted on the cylindrical surface of the casing and includes or is a turnable ring with a flange extending radially inwardly adjacent to the dial graduations. This flange which is the end face of the ring carries at least one of a plurality of zones of fixed circumferential dimension and radially corresponding with a desired dimension of the dial graduations. The fixed zones on the ring may be provided in any one of three ways.

13 Claims, 6 Drawing Figures

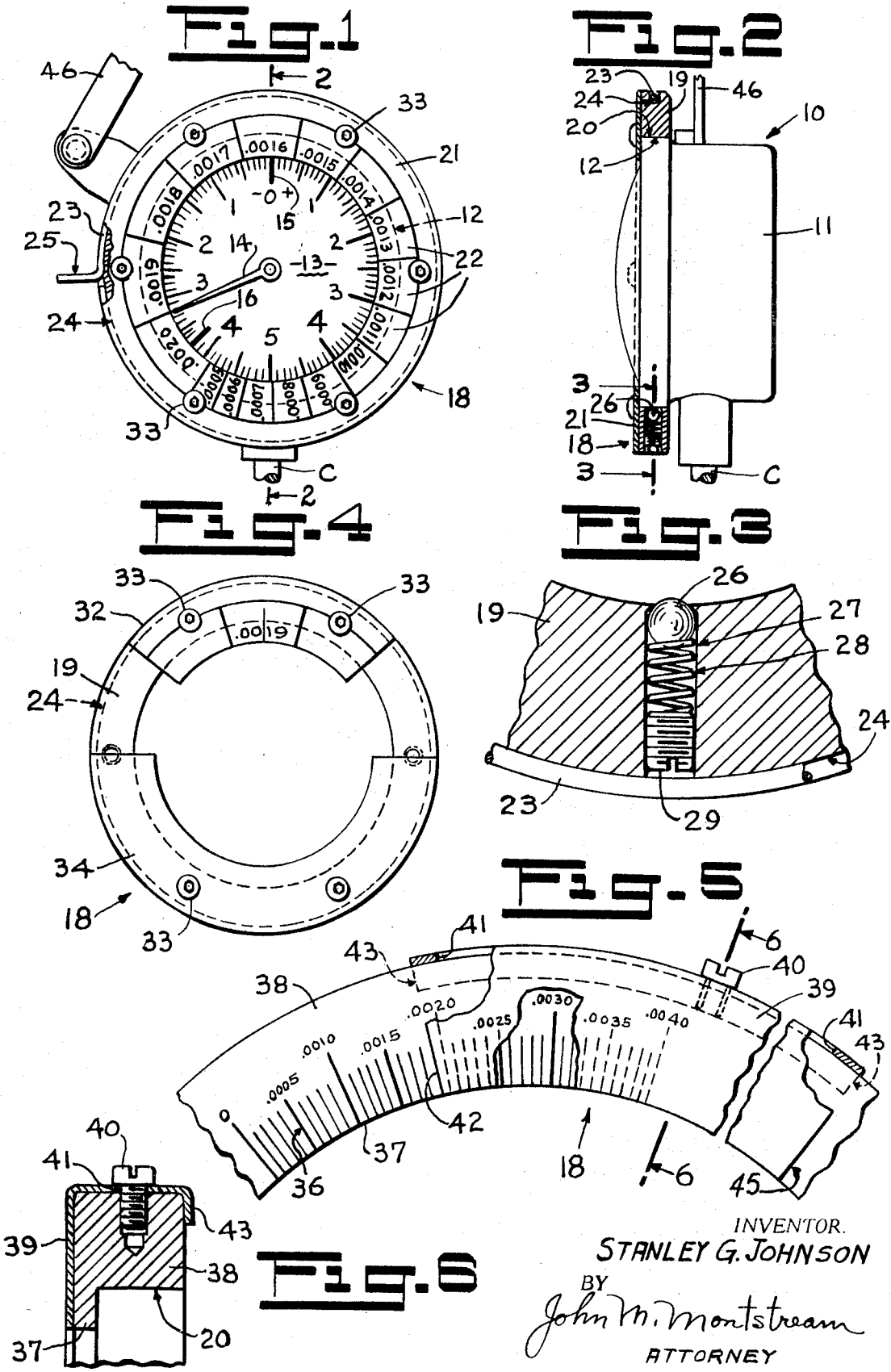

ZONAL DEVICE AND COMBINATION THEREOF WITH A DIMENSIONAL DIAL INDICATOR

The indicator and zonal device combination is an improvement of the combination of U.S. Pat. No. 3,353,277. This patent shows a pair of adjacent gage units, one with a tri-roll gaging means and the other with a segmental form of gaging means, although the former may have a second tri-roll gaging means on the opposite side of the gage arms and the latter may similarly have a second segmental type of gaging means on the opposite side of its gage arms. An indicator and a differential zonal device is provided for each gage unit with the two zonal devices preferably inter-connected. If a more detailed test of a screw thread should be desired another adjacent gage unit may be used. The combination herein is suitable also for use with the gage of FIG. 4 of the above mentioned patent which has two gaging means on each side of the gage arms or four gages. Each gaging means will be of a different form such as a difference in length or will have a different profile for the gaging ridges on the gaging elements making up one gage and the form depends on the particular thread characteristic which is to be tested or differentially gaged. The number of gages in one setup will be determined by the number of thread characteristics which are to be tested. Two gages will provide considerable information of a test thread and ordinarily four gages will provide an ample differential test of a screw thread.

It is an object of the invention to construct a combination of a dimensional indicator and a zonal device of ring form which can be mounted on the indicator casing merely by slipping it axially thereon and without any change in the construction of the casing of a commercial indicator and turnably mounted thereon for use with a plurality of screw thread gages and provides a plurality of zonal dimensions independently on the ring.

A further object is as above and in addition the device avoids or minimizes the possibility of an erroneous setting being selected or inadvertently being changed.

Again with the form of construction having a plurality of individual zonal scales, the setting is made merely by selection of the particular zonal dimension or scale required.

Another object is to construct a zonal device which is mountable on a commercial indicator merely by slipping the same onto the casing of the indicator.

A further object is to construct a zonal device having a plurality of fixed zonal dimensions differing from each other by an increment of one or two and at least one of which is selected for use.

Other objects of the invention will be more apparent from the following description when taken in connection with the accompanying drawing illustrating preferred embodiments thereof, in which:

FIG. 1 is a front view of an indicator with a zonal device mounted thereon;

FIG. 2 is a sectional view taken on line 2—2 of FIG. 1;

FIG. 3 is an enlarged sectional view through means for turnably retaining the zonal device in set position and is taken on line 3—3 of FIG. 2;

FIG. 4 is a partial view of the zonal device having a replaceable zone plate attached to the ring with a single zone;

FIG. 5 is a partial view of another zonal device with a zone scale of substantial dimension and means to select or set the desired zonal dimension from the scale;

FIG. 6 is a section through the zonal device as taken on line 6—6 of FIG. 5.

The dimensional indicator 10 for a screw thread gage has a casing 11 with a cylindrical casing surface 12 on which the zonal device is turnably mounted. A dial 13 has circumferential graduations such as thousandths of an inch and shown as ten-thousandths of an inch, or their equivalent scale in metric units. A pointer 14 moves over the dial, the pointer being controlled by the position of the contactor C when gaging a test thread. Usually the indicator has tolerance means such as tolerance marker 15 and the 0 on the dial or two markers 15 and 16. One of the markers is adjustable so that it can be set to the required tolerance, presently set as 0.0038. The markers could be ink, or the like, marked on the glass over the dial.

The zonal device is a ring means mountable on the indicator casing and including a turnable ring. The simplest form of ring means is merely a ring 19 having a surface 20 which receives the cylindrical casing surface and on which the ring is turnable. The ring has a flange extending radially inwardly from the surface 20 to abut the face of the indicator casing and thereby axially locate the device thereon. The flange is, preferably, a separate part or plate 21 secured to an end face of the ring. This construction is a simple way to provide the fixed zonal scales on the ring as well as enabling one plate with its zonal scales to be removed and a second plate to be attached to replace the same with different zonal dimensions. The ring means and the indicator casing are free of any obstructions so that the zonal device or ring means may be freely inserted on or removed from the casing. This permits a commercial indicator to be used without change. Also the ring means is easily removed if not needed.

The flange of the ring means carries a plurality of circumferentially disposed zonal dimensions or scales 22 each having a fixed dimension in thousandths of an inch corresponding with the dial graduations or radial extensions thereof and shown as in ten-thousandths of an inch. The differential zonal scale may be 50 percent of the tolerance and the zonal scale is selected on this basis. If greater accuracy is desired it may be 40 percent or any other percentage. With a tolerance of 0.0038, the differential zonal dimension at 50 percent would be the 0.0019 dimension and the zonal ring is turned so that the edge of this zone scale is aligned with the indicator pointer whereever it may rest within the tolerance range for each test part. If the 40 percent tolerance differential is to be used, the dimension would be the 0.0015 zonal scale. In some tests, such as for flank angle, a half dimension is used or 1/2 of 0.0019 which would be the 0.0010 scale. An alternative would be to provide each zonal scale with a mid mark at the center of the zonal scale as illustrated in FIG. 4. It will be noted that two zonal scales provide additional zonal dimensions or scales, for example, 0.0010 and 0.0011 together provide 0.0021 dimension while 0.0011 and 0.0012 provide 0.0023 dimension or in increments of 0.0002. To illustrate additional use, the 0.0019 dimension could be the two zonal scales 0.0010 and 0.0009 in which event the mark separating these two zones provides a mid marker for a flank angle test.

It is desirable that a suitable zonal scale pointer or marker be provided to indicate the particular zonal scale being used and which marker turns with the zonal device or ring. That shown is a resilient wire loop 23 which is turnably received in a circumferential retaining groove 24 on the ring and having a bent up end to provide a marker for the zonal scale being used. The marker may be turned to any other zonal scale which is to be used for another test having a different tolerance or a different tolerance percentage.

Suitable means are provided to turnably retain the zonal device or ring in set position on the indicator casing. The means shown is a ball 26 which is received in a radial hole 27 in the ring and pressed against the casing surface 20 by a spring 28, the compression of which may be adjusted by a back-up screw 29. The ball type of retaining means is advantageous with a casing surface which is knurled, which it may be.

FIG. 4 shows a form of zonal device in which the ring 19 has a replaceable plate 32 with a single zonal scale marked or carried thereon and secured to the ring such as by screws 33. In this form, a plurality of individual plates are provided for attachment to the ring, each plate having a different zonal scale or dimension, one of which is selected. With a zonal plate of relatively short circumferential engagement, an aligning plate 34 is also attached to the end face of the ring in order to provide ample axial positioning support for the ring on the indicator casing.

FIG. 5 illustrates another form of zonal device in which a full zonal scale 36 is carried by the flange 37 of the ring 38.

This zonal scale provides all or a substantial part of the zonal scale range. A mask 39 is adjustably carried by ring, such as by a screw 40 which is received in a slot 41 in the mask which slot is long enough to move the zone marking edge 42 of the mask over the entire zonal scale. The mask is retained in place on the side face of the ring by convenient means such as the screw 40 and a flange 43 which engages an opposite face of the ring. The zonal scale or dimension to be used is set from the scale and fixed in set position by tightening the screw 40. In this form the zonal scale to be used is adjustably selected whereas in the other forms illustrated herein, one zonal scale is selected from a plurality of fixed zonal zonal scales. If it should be deemed desirable that the scale graduations 36 be not visible in the zone area, the scale could begin at the edge 45 of the mask when the edge 42 is at the 0 mark and the edge 45 is used to measure or fix the zonal dimension to be used.

In the forms of zonal devices shown in FIGS. 1 and 4, each zone is of a different dimension and usually will provide an incremental difference of one unit. For differential gaging of a screw thread, the increment would be one ten thousandths of an inch using the indicator dial graduations as the reference unit and dimension.

The indicator and zonal device combination on one gaging unit may be connected with that on an adjacent gaging unit by a connecting means or rod 46.

This invention is presented to fill a need for improvements in a zonal device and in a combination of an indicator and the zonal device. Various modifications may and often do occur to those skilled in the art, especially after benefiting from the teachings of an invention. This disclosure illustrates the preferred means of embodying the invention in useful form.

What is claimed is:

1. A zonal device for mounting on a dimensional dial indicator having a casing with a cylindrical surface, a dial with dimensional graduations in thousandths or ten-thousandths of an inch, and a pointer comprising ring means having a surface of a dimension to receive the casing surface and including a ring mounted to be circumferentially turned, the ring having flange means extending radially inwardly to locate the ring axially on the casing and having an inner edge, the ring means being constructed so that it is axially mountable and retained on the casing with solely the cylindrical surface and the face thereof as the cooperating mounting parts thereon, means to movably retain the ring in set circumferential position, zonal means carried by the flange means and providing a plurality of different zonal dimensions one of which is selected for use, each zonal dimension being a radial equivalent of the dial graduations in thousandths or ten-thousandths of an inch or a metric equivalent, and the zonal means being located at the inner edge of the flange means so as to be adjacent to the dimensional graduations on the dial when mounted on the indicator casing.

2. A zonal device as in claim 1 in which the zonal means includes a plurality of fixed zonal dimensions, and each zonal dimension being different from that of all of the other zonal dimensions and providing a series of zonal dimensions differing progressively by the same dimensional increment.

3. A zonal device as in claim 2 in which a plurality of the fixed zonal dimensions are carried circumferentially in succession around the flange means.

4. A zonal device as in claim 3 including means carried by the ring to indicate the zonal dimension in use and mounted for circumferential adjustment thereon.

5. A zonal device as in claim 2 in which the zonal means includes a plurality of separate elements each with a single zonal dimension, and means to secure a selected one of the zonal dimension elements to the ring.

6. A zonal device as in claim 1 including zonal dimensional graduations carried by the flange means and being the radial equivalent of the graduations on the dial of the indicator, zonal setting means carried by the ring and adjustable circumferentially thereon to select the zonal dimension desired, and means to secure the setting means in adjusted position.

7. A combination comprising a dial indicator and the zonal device as in claim 1 with the indicator including in addition a contactor, a pointer movable over the dial and connected with the contactor so as to be responsive to the position of the contactor, and tolerance limit means adjacent to the dial including at least one adjustable tolerance marker.

8. A combination as in claim 7 in which the zonal means includes a plurality of fixed zonal dimensions, and each zonal dimension being different from that of all of the other zonal dimensions and providing a series of zonal dimensions differing progressively by the same dimensional increment.

9. A combination as in claim 8 in which a plurality of the fixed zonal dimensions are carried circumferentially in succession around the flange means.

10. A combination as in claim 9 including means carried by the ring to indicate the zonal dimension in use and mounted for circumferential adjustment thereon.

11. A combination as in claim 8 in which the zonal means includes a plurality of separate elements each with a single zonal dimension, and means to secure a selected one of the zonal dimensional elements to the ring.

12. A combination as in claim 8 in which the zonal means includes a plurality of separate elements each with a single zonal dimension, and means to secure a selected one of the zonal dimensional elements to the ring.

13. A combination as in claim 7 including zonal dimensional graduations carried by the flange means and being the radial equivalent of the graduations on the dial of the indicator, zonal setting means carried by the ring and adjustable circumferentially thereon to select the zonal dimension desired, and means to secure the setting means in adjusted position.

* * * * *